United States Patent
Voit et al.

(10) Patent No.: US 12,425,336 B2
(45) Date of Patent: Sep. 23, 2025

(54) PERSONAL NETWORK SOFTWARE DEFINED-WIDE AREA NETWORKS (SD-WANs) WITH ATTESTED PERMISSIONS

(71) Applicant: Cisco Technology, Inc., San Jose, CA (US)

(72) Inventors: Eric Voit, Bethesda, MD (US); Pascal Thubert, Roquefort-les-Pins (FR); Pradeep Kumar Kathail, Los Altos, CA (US)

(73) Assignee: Cisco Technology, Inc.

( * ) Notice: Subject to any disclaimer, the term of this patent is extended or adjusted under 35 U.S.C. 154(b) by 0 days.

(21) Appl. No.: 17/935,159

(22) Filed: Sep. 26, 2022

(65) Prior Publication Data

US 2024/0106745 A1    Mar. 28, 2024

(51) Int. Cl.
| | |
|---|---|
| *H04L 45/00* | (2022.01) |
| *G06F 15/16* | (2006.01) |
| *H04L 12/46* | (2006.01) |
| *H04L 15/16* | (2006.01) |
| *H04L 45/745* | (2022.01) |
| *H04L 45/76* | (2022.01) |
| *H04W 12/71* | (2021.01) |

(52) U.S. Cl.
CPC ............ *H04L 45/54* (2013.01); *H04L 45/745* (2013.01); *H04W 12/71* (2021.01)

(58) Field of Classification Search
CPC ....... H04L 45/54; H04L 45/745; H04W 12/71
USPC ........................................................ 709/238
See application file for complete search history.

(56) References Cited

U.S. PATENT DOCUMENTS

| | | | | |
|---|---|---|---|---|
| 8,149,849 B2 * | 4/2012 | Osborn | ................. | H04L 61/106 |
| | | | | 370/401 |
| 9,154,413 B2 * | 10/2015 | Stroud | ..................... | H04L 45/72 |
| 10,079,761 B2 * | 9/2018 | Banerjee | ............... | H04W 72/30 |
| 12,155,642 B2 * | 11/2024 | Goodman | ............. | H04L 63/102 |

(Continued)

FOREIGN PATENT DOCUMENTS

| | | | | |
|---|---|---|---|---|
| BR | PI0716058 A2 * | 1/2013 | ............. | H04L 45/54 |
| CN | 102006228 A | 4/2011 | | |

(Continued)

OTHER PUBLICATIONS

Das, Rohit Kumar et al. "6LE-SDN: An Edge-Based Software-Defined Network for Internet of Things"; DOI 10.1109/JIOT.2020.2990936, IEEE Internet of Things Journal; Downloaded on May 6, 2020 at 10:36:50 UTC from IEEE Xplore; (9 pages).

*Primary Examiner* — David R Lazaro
*Assistant Examiner* — Berhanu Shitayewoldetadik
(74) *Attorney, Agent, or Firm* — Merchant & Gould P.C.

(57) ABSTRACT

Personal network Software Defined-Wide Area Networks (SD-WANs) with attested permissions may be provided. A first one of a plurality Personal Area Network (PAN) devices in a PAN may seed a routing table entry for at least one application that the first one of the plurality PAN devices supports. The routing table entry may include at least one characteristic associated with an egress link between the first one of the plurality PAN devices and a device outside of the PAN. The routing table entry may be exchanged among the plurality of PAN devices in the PAN. Then data may be routed, based on the exchanged routing table entry, in the PAN through the first one of the plurality PAN devices through the egress link to the device outside of the PAN.

20 Claims, 3 Drawing Sheets

(56) References Cited

U.S. PATENT DOCUMENTS

| | | | |
|---|---|---|---|
| 2003/0190938 A1* | 10/2003 | Ganton | H04W 52/00 455/574 |
| 2005/0089034 A1* | 4/2005 | Sakata | H04L 12/4641 709/242 |
| 2007/0070883 A1* | 3/2007 | Lysne | H04L 45/22 370/400 |
| 2007/0211681 A1* | 9/2007 | Sun | H04W 72/542 370/338 |
| 2007/0258386 A1* | 11/2007 | Liu | H04L 45/54 370/254 |
| 2008/0056261 A1* | 3/2008 | Osborn | H04L 69/08 370/392 |
| 2009/0185538 A1* | 7/2009 | Choi | H04W 8/02 370/331 |
| 2011/0075664 A1* | 3/2011 | Lambeth | H04L 65/611 370/390 |
| 2011/0085442 A1* | 4/2011 | Lin | H04W 40/248 370/328 |
| 2011/0188503 A1* | 8/2011 | Hewson | H04L 45/54 370/392 |
| 2013/0149966 A1* | 6/2013 | Lee | H04L 63/101 455/41.2 |
| 2013/0343389 A1* | 12/2013 | Stroud | H04L 45/72 370/392 |
| 2014/0169170 A1* | 6/2014 | Almog | H04L 47/32 370/235 |
| 2016/0210621 A1* | 7/2016 | Khan | G06T 1/0028 |
| 2016/0261725 A1* | 9/2016 | Lambeth | H04L 63/0272 |
| 2017/0195259 A1* | 7/2017 | Florea | H04L 47/726 |
| 2017/0324750 A1* | 11/2017 | Khan | H04W 12/068 |
| 2018/0184438 A1* | 6/2018 | Cavalcanti | H04W 74/04 |
| 2018/0219983 A1* | 8/2018 | Lambeth | H04L 69/324 |
| 2019/0260858 A1* | 8/2019 | Lambeth | H04L 63/0272 |
| 2019/0349259 A1* | 11/2019 | Rovner | H04L 1/0002 |
| 2020/0389413 A1* | 12/2020 | Lal | H04L 47/125 |
| 2020/0389544 A1* | 12/2020 | Lambeth | H04L 45/04 |
| 2021/0021517 A1* | 1/2021 | Sellappa | H04L 45/745 |
| 2021/0266257 A1* | 8/2021 | Chen | H04L 45/7452 |
| 2021/0273804 A1* | 9/2021 | Khan | H04L 9/3234 |
| 2023/0115685 A1* | 4/2023 | Hwang | H04W 8/26 709/245 |
| 2023/0198902 A1* | 6/2023 | Venkatachalapathy | H04L 45/02 370/392 |

FOREIGN PATENT DOCUMENTS

| | | |
|---|---|---|
| CN | 103068002 A | 4/2013 |
| KR | 20110015207 A | 2/2011 |

\* cited by examiner

PERSONAL NETWORK SOFTWARE DEFINED-WIDE AREA NETWORKS (SD-WANs) WITH ATTESTED PERMISSIONS

TECHNICAL FIELD

The present disclosure relates generally to personal network Software Defined-Wide Area Networks (SD-WANs) with attested permissions.

BACKGROUND

A Personal Area Network (PAN) may connect electronic devices within an individual person's workspace. The size of a PAN may range from a few centimeters to a few meters. An example of a PAN may be the connection between a Bluetooth earpiece and a smart phone. PANs may also connect laptops, tablets, printers, keyboards, and other computerized devices. PAN network connections may either be wired or wireless. Wired connections may include Universal Serial Bus (USB) and FireWire. Wireless connections may include Bluetooth, Wi-Fi, Infrared Data Association (IrDA), and Zigbee.

While devices within a PAN may exchange data with each other, PANs may not include a router and thus may not connect to the Internet directly for example. A device within a PAN, however, may be connected to a Local Area Network (LAN) that then connects to the Internet. For example, a desktop computer, a wireless mouse, and wireless headphones may all be connected to each other, but only the computer may connect directly to the Internet.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
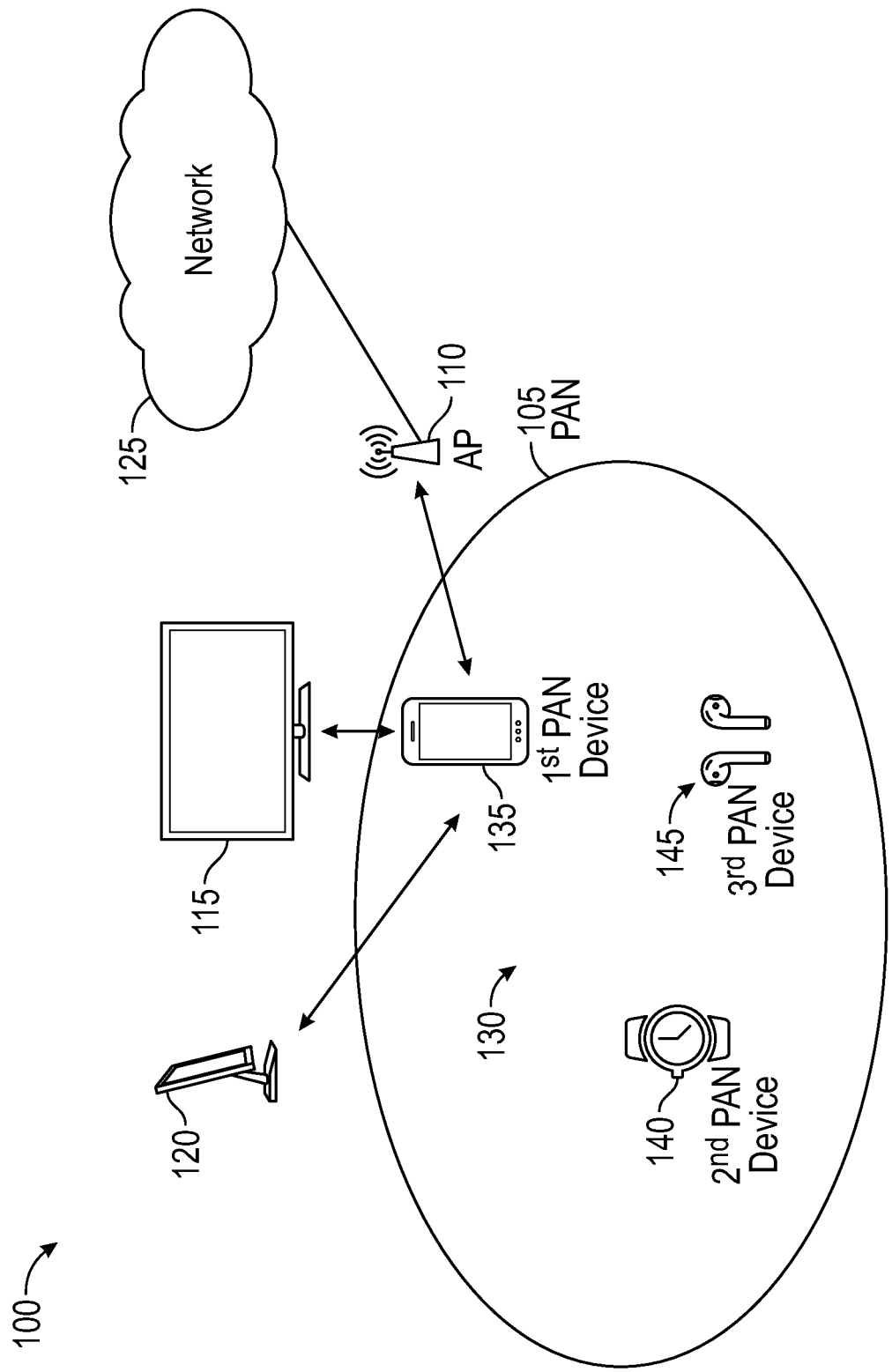
FIG. 1 is a block diagram of an operating environment for providing personal network Software Defined-Wide Area Networks (SD-WANs) with attested permissions.

Personal network Software Defined-Wide Area Networks (SD-WANs) with attested permissions may be provided. A first one of a plurality Personal Area Network (PAN) devices in a PAN may seed a routing table entry for at least one application that the first one of the plurality PAN devices supports. The routing table entry may include at least one characteristic associated with an egress link between the first one of the plurality PAN devices and a device outside of the PAN. The routing table entry may be exchanged among the plurality of PAN devices in the PAN. Then data may be routed, based on the exchanged routing table entry, in the PAN through the first one of the plurality PAN devices through the egress link to the device outside of the PAN.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A Personal Area Network (PAN) may comprise a collection of integrated digital devices associated with a person's identity. The PAN may include independent peripherals supporting a mix of link layer communications technologies that may interface outside the PAN. With respect to wireless, some of these link layer technologies may include, but are not limited to, satellite, Fifth Generation (5G), Wireless Local Area Network (WLAN), Bluetooth, Near Field Communications (NFC), and Nanoscale.

PAN bandwidth externally facing from the PAN may be shared across the independent peripheral devices of the PAN. Where multiple links supporting Internet Protocol (IP) connectivity are available, a user may expect SD-WAN like network behavior. In other words, each application/peripheral may have its Service Level Agreements (SLAs) balanced and respected. The result may be outside-PAN IP reachability for each peripheral/application orchestrated within the PAN. Traffic may then be addressed and directed as appropriate.

If the aforementioned were accomplished, conventional SD-WAN processes may be applied. These processes may include, but are not limited to, reachability on a path at a certain bandwidth, optimal usage of all available bandwidth, application visibility, and application steering control for example. Additionally, new forwarding considerations and metrics beyond conventional SD-WAN processes may be used. For example, available battery power may be considered and optimized when orchestrating which outside-PAN link is to be use. For some applications, locality may be demanded for a next hop (e.g., if a shared screen is being used to display video or if a common area printer is being sought or being tried to be use.)

Moreover, for many wireless technologies as the spanned distance gets smaller, the implicit security model may change. This may open security issues within many use cases that may be taken for granted. For example, when a phone is tapped using NFC to pay for items at a point-of-sale, it may not be known that the sales terminal being tapped is not compromised.

With the above issues under consideration, the problems solved by embodiments of the disclosure may include SD-WAN like metrics at the PAN edge to optimally steer application flows outside the PAN. In addition, embodiments of the disclosure may include how to incorporate metrics so that a specific link may only be traversed for an application when next-hop security conditions are met. One useful outcome may be that consistent security policies may be defined and enforced independent of the link layer connection/vendor. This may include security policies that may be applied at ingress links to the PAN. Moreover, the same metrics may not only be used at the PAN-edge, but may be used on devices within the PAN. Accordingly, it may be possible to find an appropriate path inside the PAN network (e.g., if there is no direct connection) based on certain policy and profile information (e.g., battery power, trust of intermediate PAN device, etc.).

Attestation may comprise an example trusted computing approach that may be used to verify the integrity of a device. Attestation may be applied to a device to review logs from connected devices, such as Layer 1 (L1) or Layer (L2) connected devices and maintain these logs in trusted storage. These logs may be protected, for example, by embedding a private key into every trust anchor produced for a hardware device and publishing the device's public key as a certificate to adjacent devices. This peering device may then push log updates from trusted storage periodically and/or on some log entry event. Reviewing any provided signed logs may provide an understanding of the current trustable state of a peer device. Moreover, by looking back at the set of transactions that may have occurred since boot time, a determination may be made regarding the trustworthiness of the information which that peer device may be asserting.

Confidential computing may be used with embodiments of the disclosure. Confidential computing may be performed when a secure enclave of a physical computing devices may be allocated to a particular application. In some cases, only a program with a proven developer may modify or have visibility into data processed or stored the secure enclave.

Embodiments of the disclosure may use various techniques for placing and maintaining workloads on sufficiently trustworthy subsystems within a distributed network. An example may include identifying at least one trustworthiness requirement associated with an application; transmitting, to a first subsystem, a request for at least one trustworthiness characteristic of the first subsystem and at least one second subsystem connected to the first subsystem; receiving, from the first subsystem, a response indicating the at least one trustworthiness characteristic; determining that the at least one trustworthiness characteristic satisfies the at least one trustworthiness requirement; and based on determining that the at least one trustworthiness characteristic satisfies the at least one trustworthiness requirement, causing the application to operate on a mesh including the first subsystem and the at least one second subsystem.

Embodiments of the discourse may also use Mutually Assured Secure Channel (MASC). Between two confidential computing supporting devices, man-in-the-middle attacks/hijacking may be inhibited from root enabled hackers. Therefore PAN routing may consider the availability of confidential computing established secure channels. One viable technology for this function emerging from a confidential compute protected code may include Transport Layer Security (TLS) with a negotiated Finite Field Diffie-Hellman key exchange for example.

FIG. 1 shows an operating environment 100 for providing personal network SD-WANs with attested permissions. As shown in FIG. 1, operating environment 100 may comprise a PAN 105, an Access Point (AP) 110, a High Definition Television (HDTV) 115, a monitor 120, and a network 125. PAN 105 may comprise a plurality of PAN devices 130. Plurality of PAN devices 130 may comprise smart phones, tablets, and personal digital assistants for example. As shown in FIG. 1, plurality of PAN devices 130 may comprise, but is not limited to, a first PAN device 135 (e.g., a smart phone), a second PAN device 140 (e.g., a watch), and a third PAN device 145 (e.g., ear buds). Network 125 may comprise, but is not limited to, the Internet for example.

PAN 105 may comprise a computer network for interconnecting electronic devices (e.g., within an individual person's workspace). PAN 105 may provide data transmission among first PAN device 135, second PAN device 140, and third PAN device 145 device such as computers, smart phones, tablets, and personal digital assistants. PAN 105 may be used for communication among personal devices themselves, or for connecting to a higher level network and the Internet (e.g., network 125) where one primary device (e.g., first PAN device 135) may take up the role as a gateway. First PAN device 135 may connect to AP 110 wirelessly via Wi-Fi, 5G, or satellite for example. First PAN device 135 may connect to HDTV 115 or monitor 120 wirelessly via Bluetooth or NFC for example. First PAN device 135 may apply a security policy to the egress link between first PAN device 135 and devices outside of PAN 105. The devices outside PAN 105 may comprise, but are not limited to HDTV 115, monitor 120, or a device on network 125. Ones of plurality of PAN devices 130 may comprise, but are not limited to, a smart phone, a personal computer, a tablet device, a mobile device, a telephone, a remote control device, a set-top box, a digital video recorder, an Internet-of-Things (IoT) device, a network computer, a watch, ear buds, a router, Virtual Reality (VR)/Augmented Reality (AR) devices, or other similar microcomputer-based device.

The elements described above of operating environment 100 (e.g., AP 110, HDTV 115, monitor 120, first PAN device 135 (e.g., a smart phone), second PAN device 140 (e.g., a watch), and third PAN device 145 (e.g., ear buds)) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

Figure 2:
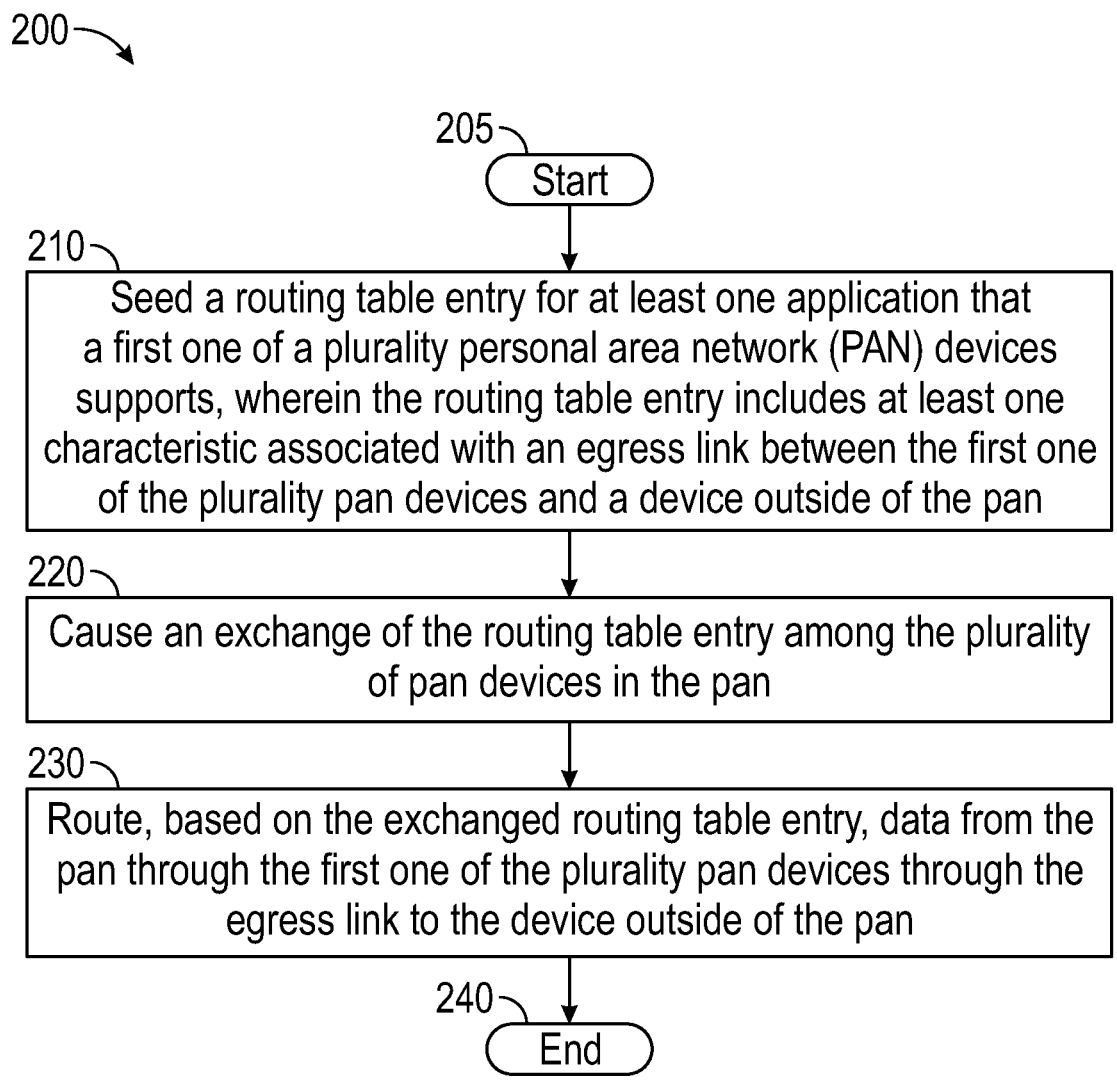
FIG. 2 is a flow chart of a method for providing personal network SD-WANs with attested permissions.

FIG. 2 is a flow chart setting forth the general stages involved in a method 200 consistent with embodiments of the disclosure for providing personal network SD-WANs with attested permissions. Method 200 may be implemented using first PAN device 135 as described above with respect to FIG. 1 that may be embodied by a computing device 300 as described in more detail below with respect to FIG. 3. Ways to implement the stages of method 200 will be described in greater detail below.

Method 200 may begin at starting block 205 and proceed to stage 210 where first PAN device 135 may seed a routing table entry for at least one application that a first one of a plurality PAN devices (e.g., first PAN device 135) supports. The routing table entry may include at least one characteristic associated with an egress link between the first one of the plurality PAN devices (e.g., first PAN device 135) and a device outside of PAN 105 (e.g., HDTV 115, monitor 120, or a device on network 125 connect through AP 110). For example, embodiments of the disclosure may provide a routing table exchange within plurality of PAN devices 130 that may allow plurality of PAN devices 130 to steer traffic to the most appropriate egress link of PAN 105 based, for example, on the combination of one or more of application, reachability, available bandwidth and any incremental pricing, power utilization, locality, next hop application identity, and attested remote device identity.

First PAN device 135 may seed an application Service Level Agreement table if first PAN device 135 is capable of supporting the application. This may be done, for example, via SD-WAN Application Aware Routing. A default application may be "internet access". It may also be possible to automatically learn the applications supported by the egress device (e.g., first PAN device 135) via a link-layer protocol to the next hop.

For each application supported by the egress device (e.g., first PAN device 135), characteristics may be acquired. These characteristics may comprise but are not limited to:
i) addressing/reachability beyond PAN 105 for the link (e.g., address of the device outside of PAN 105);
ii) link layer technology used by the egress link (e.g., Wi-Fi, NFC, 5G, Satellite);
iii) bandwidth available to that application from the egress link (e.g., this may be periodically updated);
iv) potential bandwidth limits/costs/pricing constraints (e.g. for 5G and satellite);
v) available power (e.g., remaining time);
vi) verifiable identity of the remote device outside of PAN 105 (e.g., using Secure Unique Identifier (SUID), attested application ID, developer of the remote software, etc.);
vii) location of the remote peer (e.g., using Global Positioning System (GPS), multicast Domain Name Server (mDNS), etc.).

These characteristics may be acquired with zero-operational-touch. Furthermore, not all applications may be permitted on a link. As a result, restricted applications/devices might also drive the characteristics. For example, there may be a different Wi-Fi Service Set Identifier (SSID) used for casting to a TV than is used for guest access to the internet. In addition, other orchestration may be used, as well as be centrally controlled or provisioned.

From stage 210, where first PAN device 135 seeds the routing table entry for the at least one application that the first one of a plurality PAN devices (e.g., first PAN device 135) supports, method 200 may advance to stage 220 where first PAN device 135 may cause an exchange of the routing table entry among the plurality of PAN devices 130 in PAN 105. For example, a routing protocol within plurality of devices 130 in PAN 105 may exchange the application characteristics (e.g., as discussed above) with other devices in PAN 105. The result may comprise a distributed Forwarding/Routing Table per application maintained across participating devices in PAN 105.

Once first PAN device 135 causes the exchange of the routing table entry among the plurality of PAN devices 130 in PAN 105 in stage 220, method 200 may continue to stage 230 where first PAN device 135 may route, based on the exchanged routing table entry, data from PAN 105 through the first one of the plurality PAN devices (e.g., first pan device 135) through the egress link to the device outside of PAN 105 (e.g., HDTV 115, monitor 120, or device on network 125). For example, for the application/devices directly interfacing with the person/endpoint, they may see the alternatives for egress/next hop, as well as the characteristics. Furthermore these application/devices may know the link layer types that are allowed, and mandatory encryption options for the application to traverse that link. They may also see the hardware identities remote side to allow a "permit" for a next hop. Therefore they may address and steer traffic to the best next hop. The result may comprise a synchronization of the forwarding among plurality of PAN devices 130 that may touch known applications. Once first PAN device 135 routes, based on the exchanged routing table entry, data from PAN 105 through the first one of the plurality PAN devices (e.g., first pan device 135) through the egress link to the device outside of PAN 105 (e.g., HDTV 115, monitor 120, or device on network 125) in stage 230, method 200 may then end at stage 240.

Figure 3:
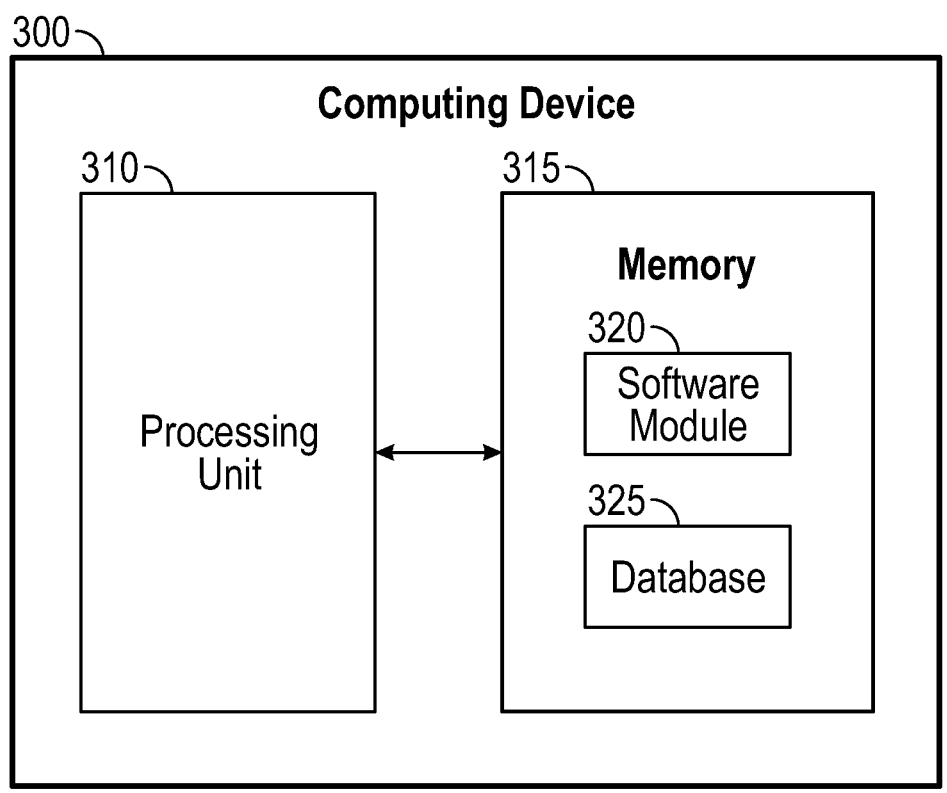
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing personal network SD-WANs with attested permissions as described above with respect to FIG. 2. Computing device 300, for example, may provide an operating environment for AP 110, HDTV 115, monitor 120, first PAN device 135 (e.g., a smart phone), second PAN device 140 (e.g., a watch), and third PAN device 145 (e.g., ear buds). AP 110, HDTV 115, monitor 120, first PAN device 135 (e.g., a smart phone), second PAN device 140 (e.g., a watch), and third PAN device 145 (e.g., ear buds) may operate in other environments and are not limited to computing device 300.

Computing device 300 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 2 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
seeding, by a first one of a plurality of Personal Area Network (PAN) devices in a PAN, a routing table entry for an application that the first one of the plurality of PAN devices supports, wherein the routing table entry for the application includes at least one characteristic associated with an egress link between the first one of the plurality of PAN devices and a device outside of the PAN for data associated with the application to be sent, and wherein the at least one characteristics is acquired by the first one of the plurality of PAN devices to access a network with attested permission;
exchanging the routing table entry among the plurality of PAN devices in the PAN; and
routing, based on the exchanged routing table entry, the data associated with the application in the PAN through the first one of the plurality of PAN devices through the egress link to the device outside of the PAN.

2. The method of claim 1, wherein the at least one characteristic comprises an address of the device outside of the PAN.

3. The method of claim 1, wherein the at least one characteristic comprises a Link Layer technology used by the egress link.

4. The method of claim 1, wherein the at least one characteristic comprises bandwidth available to the application from the egress link.

5. The method of claim 1, wherein the at least one characteristic comprises constraints on bandwidth associated with the egress link.

6. The method of claim 1, wherein the at least one characteristic comprises available power on the first one of the plurality of PAN devices.

7. The method of claim 1, wherein the at least one characteristic comprises verifiable identity of the device outside of the PAN.

8. The method of claim 1, wherein the at least one characteristic comprises a location of the device outside of the PAN.

9. The method of claim 1, further comprising providing, by the first one of the plurality of PAN devices, a security policy to the egress link between the first one of the plurality of PAN devices and the device outside of the PAN.

10. A system comprising:
a memory storage; and
a processing unit disposed in a first one of a plurality of Personal Area Network (PAN) devices in a PAN and coupled to the memory storage, wherein the processing unit is operative to:
seed a routing table entry for an application that a first one of a plurality of PAN devices supports, wherein the routing table entry for the application includes at least one characteristic associated with an egress link between the first one of the plurality of PAN devices and a device outside of the PAN for data associated with the application to be sent, and wherein the at least one characteristics is acquired by the first one of the plurality of PAN devices to access a network with attested permission;
cause an exchange of the routing table entry among the plurality of PAN devices in the PAN; and route, based on the exchanged routing table entry, the data from the PAN through the first one of the plurality of PAN devices through the egress link to the device outside of the PAN.

11. The system of claim 10, wherein the at least one characteristic comprises an address of the device outside of the PAN.

12. The system of claim 10, wherein the at least one characteristic comprises a Link Layer technology used by the egress link.

13. The system of claim 10, wherein the at least one characteristic comprises bandwidth available to the application from the egress link.

14. The system of claim 10, further comprising providing, by the first one of the plurality of PAN devices, a security policy to the egress link between the first one of the plurality of PAN devices and the device outside of the PAN.

15. A non-transitory computer-readable medium that stores a set of instructions which when executed perform a method, the method executed by the set of instructions comprising:
seeding, by a first one of a plurality of Personal Area Network (PAN) devices in a PAN, a routing table entry for an application that the first one of the plurality of PAN devices supports, wherein the routing table entry for the application includes at least one characteristic associated with an egress link between the first one of the plurality of PAN devices and a device outside of the PAN for data associated with the application to be sent, and wherein the at least one characteristics is acquired by the first one of the plurality of PAN devices to access a network with attested permission;
causing an exchange of the routing table entry among the plurality of PAN devices in the PAN; and
routing, based on the exchanged routing table entry, the data from the PAN through the first one of the plurality of PAN devices through the egress link to the device outside of the PAN.

16. The non-transitory computer-readable medium of claim 15, wherein the at least one characteristic comprises constraints on bandwidth associated with the egress link.

17. The non-transitory computer-readable medium of claim 15, wherein the at least one characteristic comprises available power on the first one of the plurality of PAN devices.

18. The non-transitory computer-readable medium of claim 15, wherein the at least one characteristic comprises verifiable identity of the device outside of the PAN.

19. The non-transitory computer-readable medium of claim 15, wherein the at least one characteristic comprises a location of the device outside of the PAN.

20. The non-transitory computer-readable medium of claim 15, further comprising providing, by the first one of the plurality of PAN devices, a security policy to the egress link between the first one of the plurality PAN devices and the device outside of the PAN.

* * * * *